United States Patent
Erden et al.

(10) Patent No.: US 7,064,914 B1
(45) Date of Patent: Jun. 20, 2006

(54) POSITION ERROR SIGNAL QUALITY

(75) Inventors: Mehmet Fatih Erden, Pittsburgh, PA (US); Richard L. Keizer, Minnetonka, MN (US); Alexei Hiram Sacks, Edina, MN (US); Timothy Francis Ellis, Tonka Bay, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 29 days.

(21) Appl. No.: 11/020,969

(22) Filed: Dec. 22, 2004

(51) Int. Cl.
*G11B 27/36* (2006.01)
*G11B 5/09* (2006.01)
*G11B 5/596* (2006.01)

(52) U.S. Cl. .................. 360/31; 360/53; 360/77.01; 360/78.01

(58) Field of Classification Search .................. None
See application file for complete search history.

(56) References Cited

U.S. PATENT DOCUMENTS

| | | | | |
|---|---|---|---|---|
| 4,247,938 A | * | 1/1981 | Kurihara et al. ............ 714/705 |
| 5,309,299 A | | 5/1994 | Crossland et al. ........ 360/77.01 |
| 5,602,692 A | | 2/1997 | Freitas et al. ............ 360/77.08 |
| 5,985,163 A | | 11/1999 | Cha et al. ...................... 216/22 |
| 6,005,739 A | | 12/1999 | Yun ........................ 360/77.04 |
| 6,014,288 A | | 1/2000 | Cha et al. .................... 360/103 |
| 6,049,441 A | | 4/2000 | Ottesen .................... 360/77.04 |
| 6,069,764 A | | 5/2000 | Morris et al. ............. 360/77.04 |
| 6,078,463 A | | 6/2000 | Pahr ........................ 360/77.12 |
| 6,091,567 A | | 7/2000 | Cooper et al. ........... 360/77.08 |
| 6,175,472 B1 | | 1/2001 | Valent .......................... 360/135 |
| 6,181,505 B1 | | 1/2001 | Sacks et al. ............. 360/77.08 |
| 6,188,539 B1 | | 2/2001 | Elliot et al. .............. 360/77.08 |
| 6,195,220 B1 | | 2/2001 | Ellis et al. ............... 360/77.08 |
| 6,243,224 B1 | | 6/2001 | Sacks et al. ............. 360/77.08 |
| 6,249,392 B1 | | 6/2001 | Sacks et al. ................... 360/31 |
| 6,327,108 B1 | | 12/2001 | Ellis et al. ...................... 360/65 |
| 6,377,413 B1 | | 4/2002 | Sacks et al. ................... 360/48 |
| 6,392,834 B1 | | 5/2002 | Ellis ........................ 360/77.04 |
| 6,411,459 B1 | | 6/2002 | Belser et al. ................. 360/75 |
| 6,426,845 B1 | | 7/2002 | Sacks et al. ............. 360/77.08 |
| 6,469,849 B1 | | 10/2002 | Ellis et al. ..................... 360/29 |
| 6,476,997 B1 | | 11/2002 | Fukushima et al. ....... 360/77.08 |
| 6,480,353 B1 | | 11/2002 | Sacks et al. ............. 360/97.02 |

(Continued)

*Primary Examiner*—Andrew L. Sniezek
(74) *Attorney, Agent, or Firm*—Westman, Champlin & Kelly

(57) ABSTRACT

In a method for generating a confidence level of a position error signal (PES) component that is indicative of a quality of the PES component, a PES component is generated using position signal samples of a read back signal corresponding to a servo burst pattern. Next, a noise level corresponding to noise in the read back signal is extracted using the position signal samples. A confidence level is then generated based on the PES component and the noise level. A system for performing the method includes a transformation block, a position error signal (PES) component extractor, a noise extractor, and a confidence level generator. The transformation block is configured to receive position signal samples of a read back signal corresponding to a servo burst pattern taken at a sampling frequency. A transformed domain representation of the position signal samples is then generated by the transformation block based on the sampling frequency and the servo burst pattern. The PES component extractor is configured to extract a PES component of a PES based on the position signal samples. The noise extractor is configured to extract a noise level from the transformed domain representation. The confidence level generator is configured to generate a confidence level that is indicative of a quality of the PES component based on the PES component and the noise level.

20 Claims, 13 Drawing Sheets

U.S. PATENT DOCUMENTS

| | | | |
|---|---|---|---|
| 6,490,111 B1 | 12/2002 | Sacks | 360/53 |
| 6,490,117 B1 | 12/2002 | Sacks et al. | 360/75 |
| 6,510,015 B1 | 1/2003 | Sacks et al. | 360/75 |
| 6,510,752 B1 | 1/2003 | Sacks et al. | 73/865.9 |
| 6,522,493 B1 | 2/2003 | Dobbek et al. | 360/75 |
| 6,538,838 B1 | 3/2003 | Sacks et al. | 360/77.01 |
| 6,556,933 B1 | 4/2003 | Sacks et al. | 702/79 |
| 6,574,068 B1 | 6/2003 | Hampshire et al. | 360/77.08 |
| 6,608,477 B1 | 8/2003 | Sacks et al. | 324/210 |
| 6,614,608 B1 | 9/2003 | Belser et al. | 360/48 |
| 6,627,254 B1 | 9/2003 | Angelo et al. | 427/129 |
| 6,643,090 B1 | 11/2003 | Pruett | 360/78.04 |
| 6,678,110 B1 | 1/2004 | Ellis | 360/77.08 |
| 6,707,624 B1 | 3/2004 | Erden et al. | 360/31 |
| 6,751,045 B1 | 6/2004 | Morris et al. | 360/77.04 |
| 6,762,895 B1 | 7/2004 | Osafune | 360/46 |
| 6,768,956 B1 | 7/2004 | Hayashi | 702/91 |
| 6,798,592 B1 | 9/2004 | Codilian et al. | 360/51 |
| 6,798,606 B1 | 9/2004 | Tang et al. | 360/77.08 |
| 2003/0147171 A1* | 8/2003 | Li et al. | 360/77.04 |

* cited by examiner

POSITION ERROR SIGNAL QUALITY

FIELD OF THE INVENTION

The present invention relates generally to servo control systems of data storage devices, and more particularly but not by limitation to circuitry and methods for establishing a confidence level that is indicative of a quality of a position error signal component used in servo control systems to establish a position of a head.

BACKGROUND OF THE INVENTION

A typical disc drive comprises a plurality of rigid magnetic storage discs which are axially aligned and arranged about a spindle motor for rotation at a constant high speed (such as around 10,000 revolutions per minute). An array of read/write heads are provided to transfer data between tracks of the discs and a host computer in which the disc drive is mounted. The heads are mounted to a rotary actuator assembly and are controllably positioned adjacent the tracks by a closed loop servo control system.

The servo control system primarily operates in one of two selectable modes: seeking and track following. A seek operation entails moving a selected head from an initial track to a destination track on the associated disc surface through the initial acceleration and subsequent deceleration of the head away from the initial track and toward the destination track. A velocity control approach is used whereby the velocity of the head is repeatedly measured and compared to a velocity profile defining a desired velocity trajectory for the seek. Once the head has settled on the destination track, the servo system enters a track following mode of operation wherein the head is caused to follow the destination track until the next seek operation is performed.

Both track seeking and track following operations typically require generation of a position error signal (PES) which gives an indication of the radial position of the head with respect to the tracks on the disc. In high performance disc drives, the PES is derived from either a prerecorded servo disc with a corresponding servo head (a dedicated servo system), or from servo information that is embedded on each recording surface among user data blocks at predetermined intervals (an embedded servo system).

The head provides the servo information to the servo system which generates the PES with a magnitude that is typically equal to zero when the head is positioned over the center of the track ("on track"), and is nominally linearly proportional to a relative off-track distance between the head and the center of the track.

The track center for reading and writing is generally defined by servo bursts patterns or fields that are read by the read head as a read back signal. The burst patterns typically comprise a Null Pattern that causes amplitude components of the PES to approach zero amplitude when the head is positioned between two tracks. At such low levels, noise in the system can dominate the PES components thereby reducing the quality of the PES components. As a result, position information that is obtained using such low quality PES components may be unreliable.

Embodiments of the present invention provide solutions to these and other problems, and offer other advantages over the prior art.

SUMMARY OF THE INVENTION

The present invention is generally directed to methods and servo control systems for generating a confidence level of a position error signal (PES) component that is indicative of a quality of the PES component. In the method, a PES component is generated using position signal samples of a read back signal corresponding to a servo burst pattern. Next, a noise level corresponding to noise in the read back signal is extracted using the position signal samples. A confidence level is then generated based on the PES component and the noise level.

In accordance with one embodiment of the method, the step of extracting a noise level is performed by generating a transformed domain representation of the position signal samples in the form of a vector that includes noise components relating to noise in the read back signal and a position signal component corresponding to the PES component. In accordance with additional embodiments of the method, the noise component having a maximum absolute value relative to the other noise components is set as the noise level. In accordance with one embodiment of the invention, the confidence level is generated by first calculating a confidence level ratio of the PES component to the noise level. The confidence level is then set based on a comparison between the ratio and a threshold value.

The servo control system of the present invention includes a transformation block, a position error signal (PES) component extractor, a noise extractor, and a confidence level generator. The transformation block is configured to receive position signal samples of a read back signal corresponding to a servo burst pattern taken at a sampling frequency. A transformed domain representation of the position signal samples is then generated by the transformation block based on the sampling frequency and the servo burst pattern. The PES component extractor is configured to extract a PES component of a PES based on the position signal samples. The noise extractor is configured to extract a noise level from the transformed domain representation. The confidence level generator is configured to generate a confidence level that is indicative of a quality of the PES component based on the PES component and the noise level.

In accordance with one embodiment of the system, the transformation block includes a plurality of multipliers, each configured to output a multiplication of the position signal samples with a row of a transformation matrix, and summing blocks configured to receive the outputs from the multipliers and produce vector components of the transformed domain representation. The vector components of the transformed domain representation include noise components corresponding to noise in the read back signal and a position signal component corresponding to the PES component. One embodiment of the extractor block includes a comparator configured to receive absolute values of the noise components and output a maximum thereof as the noise level. One embodiment of the confidence level generator includes an inverter configured to invert the noise level, and a multiplier configured to multiply the inverted noise level with an absolute value of the PES component to thereby produce a confidence level ratio. The confidence level generator is configured to produce the confidence level based on the confidence level ratio.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
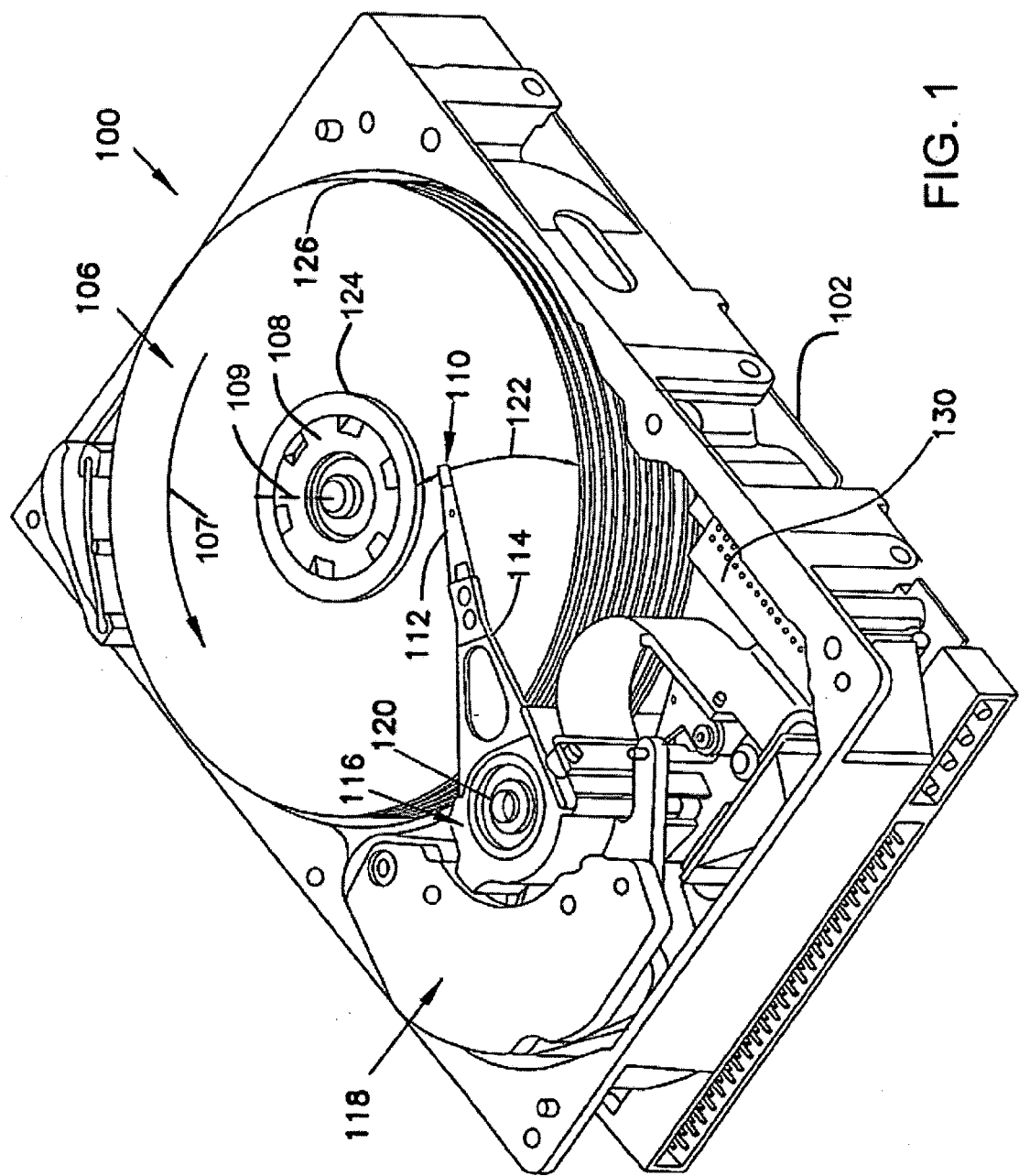
FIG. 1 is an isometric view of a disc drive.

FIG. 1 is an isometric view of a disc drive 100 in which embodiments of the present invention are useful. The disc drive 100 includes a housing with a base 102 and a top cover (not shown). The disc drive 100 further includes a disc pack 106, which is mounted on a spindle motor (not shown) by a disc clamp 108. The disc pack 106 includes a plurality of individual discs, which are mounted for co-rotation about a central axis 109, as indicated by arrow 107. Each disc surface has an associated disc head slider 110 which is mounted to the disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. The voice coil motor 118 rotates the actuator 116 with its attached heads 110 about a pivot shaft 120 to position the heads 110 over a desired data track along an arcuate path 122 between a disc inner diameter 124 and a disc outer diameter 126. The voice coil motor 118 is driven by servo electronics 130 based on signals generated by the heads 110 and a host computer (not shown).

Figure 2:
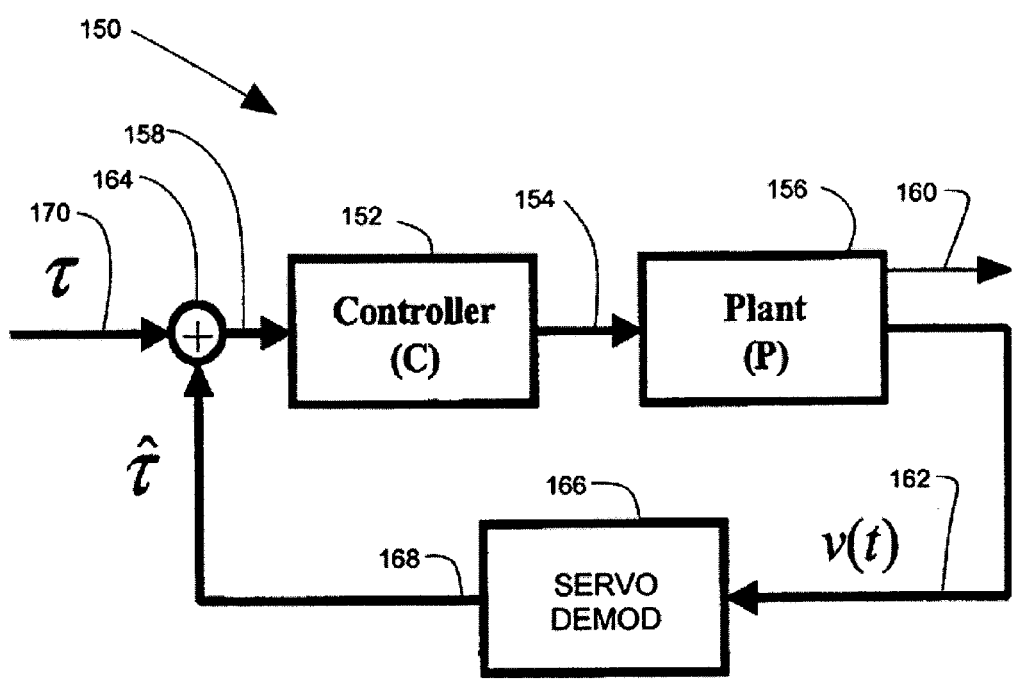
FIG. 2 illustrates a servo system for controlling a head slider position in a disc drive.

FIG. 2 illustrates a servo system 150 for controlling a position 160 of a transducing head slider (such as head slider 110 in FIG. 1) relative to a track on a disc. The servo system 150 is arranged as a control loop that includes a controller 152, a plant 156, a servo demodulator 166, and a summing junction 164.

The summing junction 164 receives a reference position output signal 170 ($\tau$) and a position estimate output signal 168 ($\hat{\tau}$). The reference position output signal 170 indicates a desired head position relative to a center of a track that is being read. The summing junction 164 calculates the difference between the desired and estimated signals 170 and 168 to provide the error output 158 that is representative of a desired adjustment of the position of the head slider.

The error output 158 is provided to the controller 152, which in turn produces a control output 154 for the plant 156. The plant 156 is configured to move the position of the transducing head toward the desired position indicated by signal 170, based on the control output 154. The control output 154 typically comprises a voice coil current, or an output to a microactuator, that is provided to a voice coil motor (such as VCM 118) or a microactuator of the plant 156, which responsively moves the head slider toward the desired position.

The plant 156 represents the magnetic (or possibly optical) recording system whose servo data output signal 162 is a read back signal with servo specific position information. The read back signal is produced in response to sensing of servo sectors on the recording medium, such as a disc (such as disc of disc pack 106 in FIG. 1), by a transducing read head of the head slider. The servo sectors include pre-recorded position data for each track including servo burst patterns that are used to generate a position error signal (PES) in the read back signal 162 that indicates a position of the head relative to a center of the current track. Accordingly, the read back signal 162 corresponding to the servo data can be used to obtain current position information for the head slider including a current track and a location of the head relative to a center of the current track.

The read back signal 162 is provided to the servo demodulator 166, which includes circuitry that demodulates and decodes the position data to extract the PES and the current track position, which is provided in the position estimate output signal 168. When the desired position of the head indicated by the reference signal 170 is set to zero for track center, the difference between the position estimate signal 168 and the reference or desired position signal 170 will be the PES once the head is positioned over the desired track. However, the desired position of the head may be an offset value from the center of the track. As a result, once the head is positioned over the desired track, the error output 158 may consist of a difference between a desired PES representative of a desired position within the track and the actual or estimated PES produced by the servo demodulator that is representative of the current position of the head relative to a center of the track.

Figure 3:
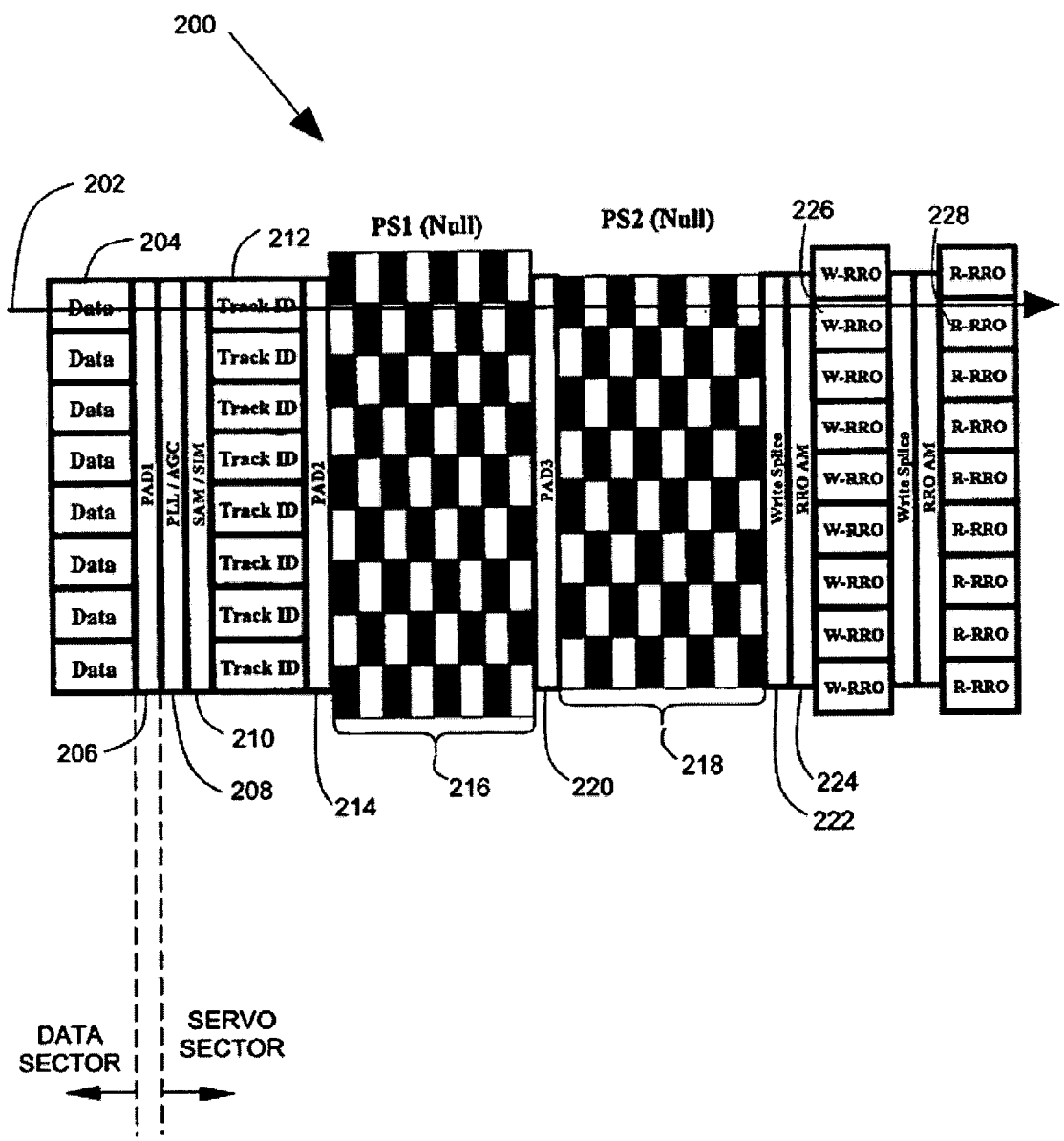
FIG. 3 illustrates servo sector formatting on a disc of a disc drive.
Figure 4:
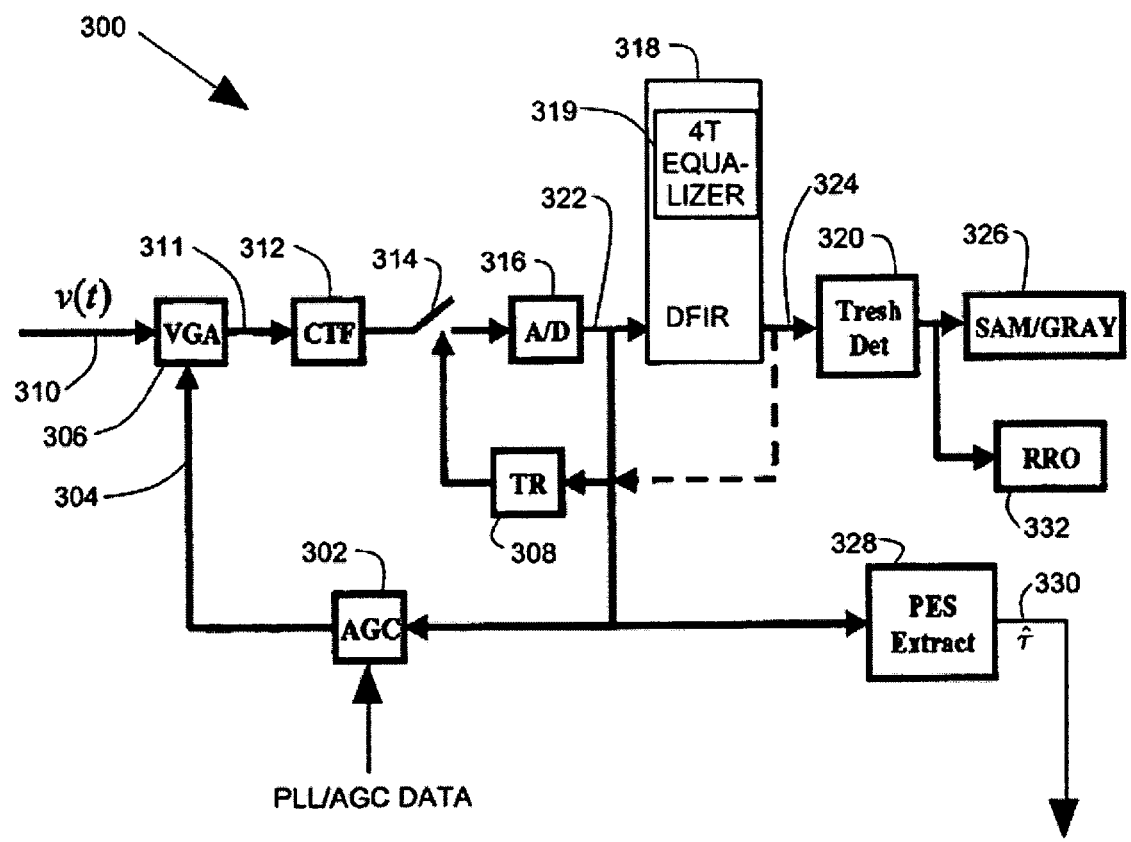
FIG. 4 is a block diagram of a servo demodulator of the servo system shown in FIG. 2.

A more detailed discussion of the operation of the servo demodulator 166 will be provided with reference to FIGS. 3 and 4. FIG. 3 illustrates an enlarged portion of an example of a typical servo sector (also called embedded servo) format 200 on a disc in a disc drive. As explained above, the read back signal 162 corresponding to each servo sector field is processed by the servo demodulator, a exemplary architecture of a servo demodulator 300 in accordance with embodiments of the invention is provided in FIG. 4.

It is understood by those skilled in the art that the portion of the servo sector 200 illustrated in FIG. 3 is greatly enlarged so that the track portions appear to be in straight lines, but are actually part of circular tracks on a disc. During disc drive operation, a read/write head moves relative to the disc from left to right along an arc, such as arc 202, and produces a read back signal (such as read back signal 162 in FIG. 2). The read back signal includes data from servo sector fields of the servo sector. The read back signal is then processed by a servo demodulator (such as servo demodulator 166 in FIG. 2).

Referring now to FIG. 3, as the read head moves along the track 202, it first reads data sector 204 and then the space PAD1 206 and then begins reading the servo sector starting with a PLL/AGC field 208. The data written in the field 208 is the same all along the cross-track direction. Using the data received from the PLL/AGC field 208, an automatic gain controller (AGC) 302 (FIG. 4) provides an AGC output 304 that adjusts a gain of a variable gain amplifier (VGA) 306. The variable gain amplifier 306 amplifies the read back signal 310. The variable gain amplifier 306 provides an amplified output 311 that couples through a cascade of circuits including continuous time filter (CTF) 312, a sampling switch 314, an analog-to-digital (A/D) converter 316, a digital finite impulse response (DFIR) circuit 318 and a threshold detector 320. An equalizer 319 in the DFIR 318 provides updated outputs every T, but filtering in the DFIR 318 waits for 4 T and gets 4 samples to output every other 4 T, and the threshold detector 320 operates on signals every other 4 T. The equalizer 319 is referred to as a "4 T equalizer" since it is optimized for a subsequent filter which waits for 4 samples before providing output. A timing recovery (TR) circuit 308 senses an output 322 from the A/D converter 316 or, alternatively, an output 324 from the DFIR 318, to recover the phase and frequency offset from the read back signal to control sampling at the sampling switch 314 at the correct sampling instances.

Next, a SAM/SIM field 210 (FIG. 3) is read. The SAM/SIM field 210 stores the same data for Servo Address Mark (SAM) or Servo Index Mark (SIM) for all the cross-track direction. The variable gain amplifier 306 and the timing recovery circuit 308 are adjusted prior to reading the SAM/SIM field, and the servo demodulator circuit 300 (FIG. 4) is ready to demodulate the read back data from the SAM/SAM field 210. Once the SAM/SIM information is detected using the SAM/GRAY circuit 326, the SAM/GRAY circuit 326 then detects the gray-coded Track ID 212 (FIG. 3). Once the Track ID 212 of the next desired track is correctly detected, the magnetic head is presumed to be in the vicinity of the center line of the desired track. After an additional space PAD 2 at 214, the head reads Position Signal 1 (PS1) field or servo burst pattern 216 and Position Signal 2 (PS2) field or servo burst pattern 218, which are separated by another space PAD3 at 220.

The servo demodulator circuit 300 (FIG. 4) processes the data in PS1 and PS2 using a PES Extract circuit 328 to extract and provide a position estimate output 330 (corresponding to position estimate output 168 in FIG. 2). As mentioned above, the position estimate output 168 and the position error signal 158 or 330 (FIG. 4) are often the same value because the reference position output (desired PES) is usually zero for the center of the track. With the use of the error signal 158, the servo system 150 (FIG. 1B) moves the read/write head toward the desired position.

After the PS2 field 218, a Write Splice space 222 is provided, followed by a Repeatable Run Out (RRO) Address Mark (AM) 224. The address mark 224 is detected with the help of "SAM/GRAY" circuit 326 (FIG. 4), and a W-RRO field 226 associated with the write process (W-RRO) is detected. A read R-RRO field 228 is also detected. An RRO circuit 332 processes R-RRO and W-RRO information to be used during the read or write processes, respectively, to make the final adjustments on the head location against the RRO effects in the system before the head starts writing or reading data sectors.

Because of the limitations of the servo loop latency in FIG. 2, the servo demodulator block 166 has to complete all the above-described functionalities within few clock cycles.

Thus, each sub block in FIG. 4 should be simple to implement, yet effective to locate the magnetic head at the center of track during writing or reading data tracks. This is also true for extracting the PES signal components with the PES component extractor 328 using the PS1 and PS2 fields.

Figure 5:
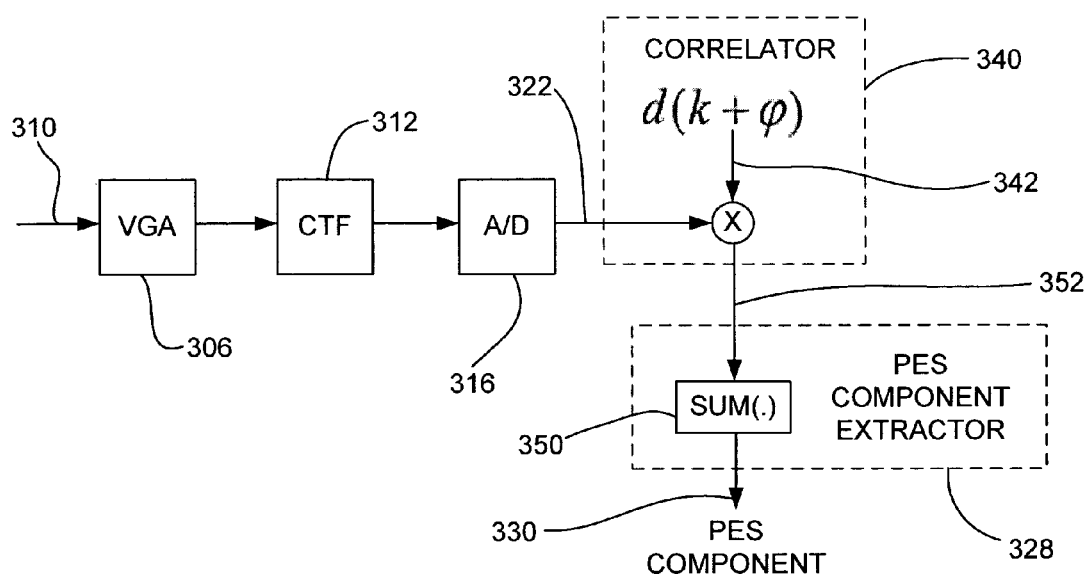
FIG. 5 is a block diagram of a data path for a PES component extractor of a servo demodulator.

FIG. 5 is a block diagram of the data path for the PES component extractor 328 of the servo demodulator 300. The PES component extractor 328 processes the PS1 and PS2 fields (FIG. 3) of the read back signal 310 by first correlating the output 322 of the A/D converter 316 with a suitable correlator, such as correlator 340, with a correlating signal 342, such as $d(k+\phi)$, that determines the sampling of the position signal samples 322 in accordance with the servo burst patterns or fields SP1 and SP2 and other factors. The PES component extractor 328 also includes a summing block 350, at which the extracted samples 352 are summed to thereby generate the PES component 330.

The parameter $\phi$ stands for the modulator phase error, which will be assumed to be for a Null Pattern for the PS1 and PS2 fields to simplify the discussion of the PES component extractor 328. After processing the PS1 field by summing the corresponding samples 352 of the read back signal 310, the PES component extractor 328 outputs a number $PES_n(\epsilon)$, which is the normal or in-phase component of the PES 330, where $\epsilon$ represents the amount of off-track. After processing the PS2 field, the PES component extractor 328 outputs another number $PES_q(\epsilon)$, which is the quadrature component of the PES 330.

The normal and quadrature components of the PES 330 can be further processed to obtain their Seamless representations. The normal ($S_n$) and quadrature ($S_q$) components of the Seamless representation are determined in accordance with Equations 1 and 2 below. The Seamless pair is provided to a final linearization block to obtain the error signal 158 (FIG. 2) for the controller 152 in the servo system 150.

$$S_n(\varepsilon) = \frac{PES_n(\varepsilon)}{|PES_n(\varepsilon)| + |PES_q(\varepsilon)|} \qquad \text{Eq. 1}$$

$$S_q(\varepsilon) = \frac{PES_q(\varepsilon)}{|PES_n(\varepsilon)| + |PES_q(\varepsilon)|} \qquad \text{Eq. 2}$$

Confidence Level Generation

In the conventional method explained above, the PES component extractor 328 outputs 2 numbers $PES_n(\epsilon)$ and $PES_q(\epsilon)$ as a function of off-track amount ($\epsilon$) for each PS1 and PS2 fields. However, if the magnetic head is, for example, in the middle of either of the two servo burst patterns PS1 or PS2, the magnetization from upper portion of the pattern will cancel the magnetization of the lower portion of the pattern. Hence we will have no amplitude component to the signal from which to estimate the PES. As a result, the SNR at that time will be zero and the PES amplitude component will generally correspond to the amplitude of noise (i.e., noise level) in the read back signal and will not be an accurate representation of the desired position error. The present invention provides additional information about the quality of the PES components in the form of a confidence level, which can be further utilized to improve the performance of the system.

Figure 6:
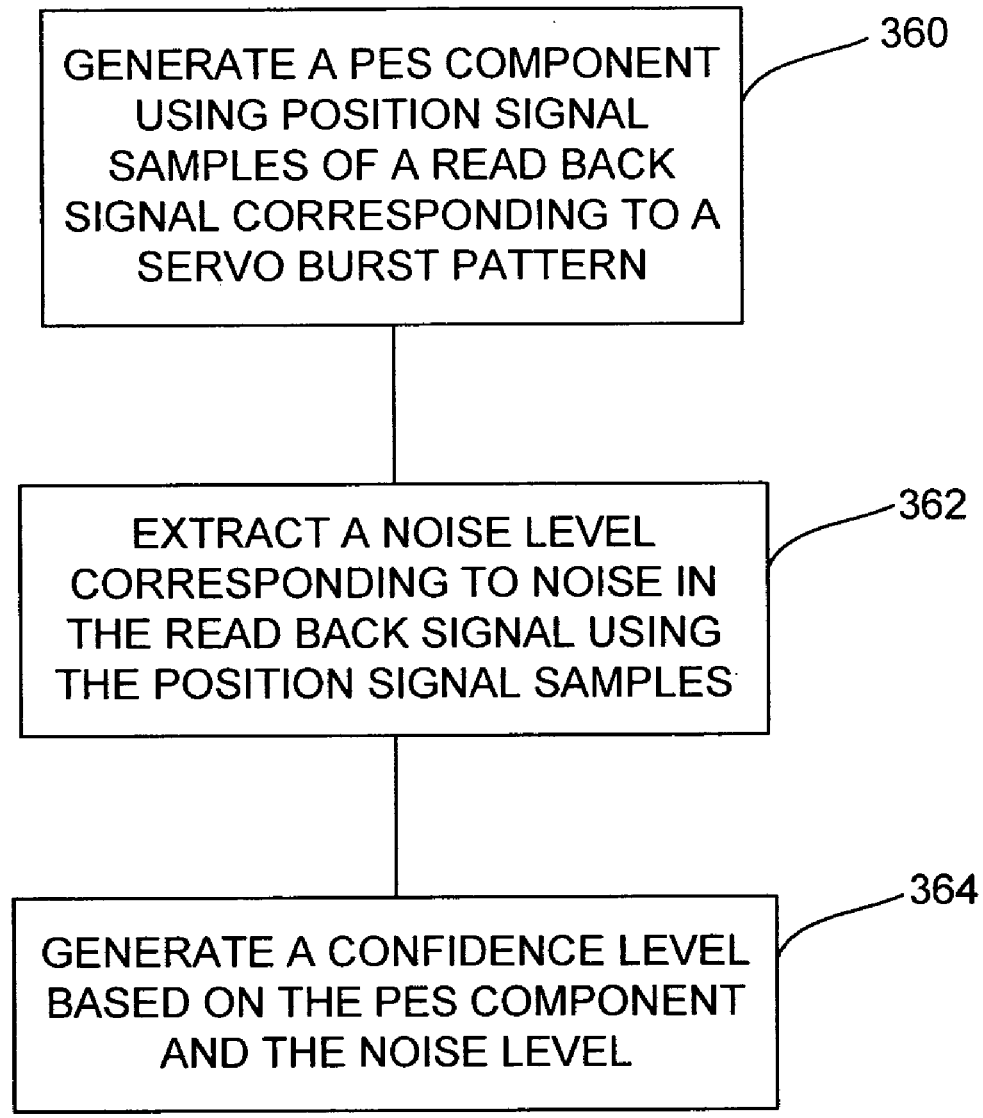
FIG. 6 is a flowchart illustrating a method of generating a confidence level of a PES component, in accordance with embodiments of the invention.

FIG. 6 is a flowchart illustrating a method of generating a confidence level C of a position error signal (PES) component produced by a servo control system that is indicative of a quality of the PES component. At step 360 of the method, a PES component is generated using position signal samples 352 (FIG. 5) of the read back signal 310 corresponding to a servo burst pattern or field. Thus, the position signal samples 352 can correspond to one of the servo burst patterns or fields PS1 or PS2 and be used to generate the normal and quadrature PES components.

At step 362, a noise level N corresponding to noise in the read back signal 310 is extracted from the position signal samples 352. Preferably, the noise level is the dominant (i.e., maximum amplitude) noise level or component in the read back signal. Finally, at step 364, the confidence level C is generated based on the noise level and the PES component.

Figure 7:
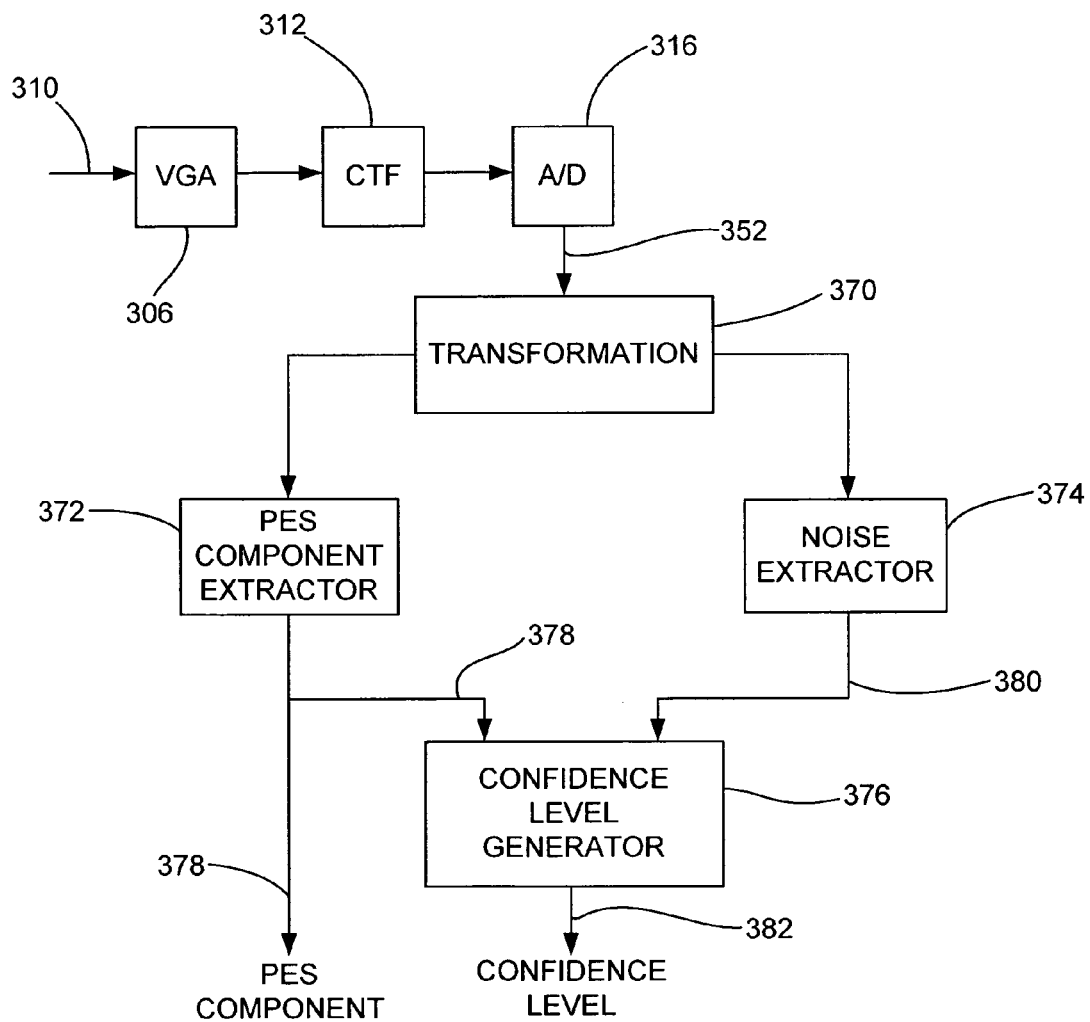
FIGS. 7–9 are block diagrams of portions of a servo control system in accordance with embodiments of the invention.

FIG. 7 is a block diagram of a portion of a servo control system that is configured to implement the method of FIG. 6. The system of FIG. 7 includes the VGA 306, the CTF 312, and the A/D converter 316, which are described above with respect to FIG. 5. Additionally, the servo control system includes a transformation block 370, a PES component extractor 372, a noise extractor 374, and a confidence level generator 376.

The transformation block 370 is configured to receive the (correlated) position signal samples from the A/D converter 316 and generate a transformed domain representation output (transformed vector $\bar{y}$) of the position signal samples based on the sampling frequency and the servo burst pattern corresponding to the noisy read back signal 310. This conversion is generally accomplished using a transform, which is based on the read back signal sampling frequency and the servo burst pattern or field corresponding to the read back signal samples 352.

An explanation of the conversion of the position signal samples 352 to their transform domain representation will be provided based on the exemplary servo burst patterns or fields PS1 and PS2 provided in FIG. 3, which are in the form of Null Patterns. Those skilled in the art understand that other servo burst patterns or fields can be used, which will have corresponding transforms that may differ from that used with the exemplary burst patterns shown in FIG. 3.

For the Null Patterns of PS1 and PS2, the Hadamard transform is used to generate the desired transform domain representation of the position signal samples. The Hadamard transform is a linear transform which is represented by its associated transformation matrix $\hat{H}$. In general, the Hadamard domain representation $\bar{y}$ of a vector $\bar{x}$ (e.g., the position signal samples 352) is obtained by multiplying the vector $\bar{x}$ with the transformation matrix $\hat{H}$, as shown in Equation 3.

$$\bar{y} = \hat{H}\bar{x} \quad \text{Eq. 3}$$

Some basic properties of the Hadamard transformation matrix $\hat{H}$ include the following: the elements of $\hat{H}$ are +1's or −1's; $\hat{H}$ is a square matrix; and $\hat{H}$ is orthogonal (i.e. $\hat{H}_N^T \hat{H}_N = N\hat{I}_N$, where N is the size of $\hat{H}$, $\hat{H}^T$ represents the transpose of $\hat{H}$, and $\hat{I}_N$ stands for the identity matrix with size N).

There are different methods that can be used to construct the Hadamard matrix. However, the most common method is provided in Equation 4, where $\hat{H}_2$ is defined in accordance with Equation 5. As can be seen, this specific construction method of the Hadamard matrix requires N to be an integer power of 2. Although, other methods can be used to construct the Hadamard matrices when N is not necessarily a power of 2, the construction mechanism described above will be used to simplify the discussion of the present invention.

$$\hat{H}_N = \begin{bmatrix} \hat{H}_{N/2} & \hat{H}_{N/2} \\ \hat{H}_{N/2} & -\hat{H}_{N/2} \end{bmatrix} \quad \text{Eq. 4}$$

$$\hat{H}_2 = \begin{bmatrix} 1 & 1 \\ 1 & -1 \end{bmatrix} \quad \text{Eq. 5}$$

A closer look at the construction of a few Hadamard matrices will now be provided. Using the Hadamard matrix $\hat{H}_2$ provided in Equation 5 together with Equation 4, $\hat{H}_4$ can be found as provided in Equation 6:

$$\hat{H}_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{Eq. 6}$$

Then, using Equation 6 with Equation 4, $\hat{H}_8$ can be obtained as provided in Equation 7.

$$\hat{H}_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{Eq. 7}$$

If we want to get $\hat{H}_{16}$, then we use $\hat{H}_8$ above together with Equation 4, and so on. Because of their specific construction method, the complexity of these matrices are on the order of N log N, like the fast Fourier transform.

The Hadamard matrices have several useful properties. For instance, because of the orthogonality property, the rows (or columns) of those matrices can be viewed as vectors orthogonal to each other which together span the whole signal space. In other words, multiplication of any row of these matrices with an arbitrary signal vector will give the projection of that arbitrary vector to that specific row. Additionally, other than the first row (or column) of the matrices, the number of +1 s and −1 s at each row (or column) is equal. Multiplication of the first row, which corresponds to all 1's, with the position signal samples (i.e., the signal vector) gives the mean value of that vector. This will, for example, correspond to the amount of overall base line shift in the system. Furthermore, since the second row corresponds to alternating +1's and −1's, multiplication of the second row with the signal vector will give the amount of the highest frequency content in signal vector. Significantly, every row of Hadamard matrix correlates the signal vector with a specific pattern, and gives an indication how much of that pattern is observed within the data set. In addition to these properties, one of the rows (or columns) of the Hadamard matrix corresponds to the servo PS1 and PS2 field (i.e., the position or read back signal samples) for the Null Pattern if the number of pulses and number of samples of each pulse are chosen carefully.

Referring again to FIG. 7, the PES component extractor 372 is configured to extract a PES component output 378, which corresponds to the servo burst pattern and is based on the position signal samples 352. In accordance with one embodiment of the invention, the PES component 378 is extracted from the transformed vector $\bar{y}$ provided by the transformation block 370. In general, the PES component 378 corresponds, or is equal to, one of the components of the vector $\bar{y}$, designated as $\bar{y}$ ($n_d$) of the transformed domain representation. Therefore, the PES component extractor is configured to complete step 360 of the method.

The noise extractor 374 is configured to extract a noise level 380 (N), preferably a dominant noise level, from the transformed domain representation of the position signal samples 352 (transformed vector $\bar{y}$), to complete step 362 of the method. In general, the noise components of the transformed vector $\bar{y}$ include all of the components of the vector $\bar{y}$ except the position signal component ($\bar{y}(n_d)$) of the transformed vector $\bar{y}$. The noise component of the transformed vector $\bar{y}$ having a maximum absolute value relative to the other noise components represents the dominant noise level 380 (N). Thus, the noise level N can be represented as N=max{abs[$\bar{y}$(n)]}, where n is not equal to nd.

The confidence level generator 376 is generally configured to perform step 364 of the method (FIG. 6) by generating a confidence level 382 (C) that is indicative of a quality of the PES component 378 based on the PES component 378 and the noise level 380. The higher the value of the PES component 378 is relative to the noise level 380, the greater the confidence in the accuracy or quality of the PES component 378 and the more likely that the PES component 378 represents useful head position information. As a result, such PES components 378 are given high confidence levels.

An example of the operation of the system will now be provided using the Hadamard transformation and an assumption that the number of pulses in each PS field is equal to power of 2 and the number of samples for each pulse is also equal to power of 2. Assuming that we have 32 pulses (or 16 servo periods) in each PS field, and we have 2 samples for each pulse (or 4 samples for each period), then one servo period will be [1 1 −1 −1], which is repeated 16 times. We assume that this data is written in PS1, and half a track width shifted version is written in PS2. If we get the Hadamard matrix $\hat{H}_{64}$ of length 64, we see that this data sequence is equal to the 3rd row of $\hat{H}_{64}$. Then, all the PES component information will be at $n_d$ equal to 3, and the other components of $\bar{y}$(n) will represent noise. In other words, the position signal component of the transformed vector $\bar{y}$ (i.e., the PES component 380) will be $\bar{y}$(3) and the confidence level C will be obtained by comparing the absolute value of the vector $\bar{y}$(3) with the maximum absolute value of the other components (i.e., noise components) of the transformed vector $\bar{y}$.

Referring again to FIG. 7, one option for the transformation block 370 is to wait until all of the position signal samples 352 corresponding to each PS field are obtained before transforming them into the transform domain representation by multiplying the position signal samples 352 by the corresponding transform matrix $\hat{H}$ (e.g., Hadamard transform matrix) to obtain the transformed vector $\bar{y}$. Thus, for example, the transformation block 370 would have to wait for the whole 64 position signal samples 352 before the transformed vector $\bar{y}$ could be obtained. However, the delay or servo loop latency resulting from such a configuration would likely be unacceptable.

Figure 8:
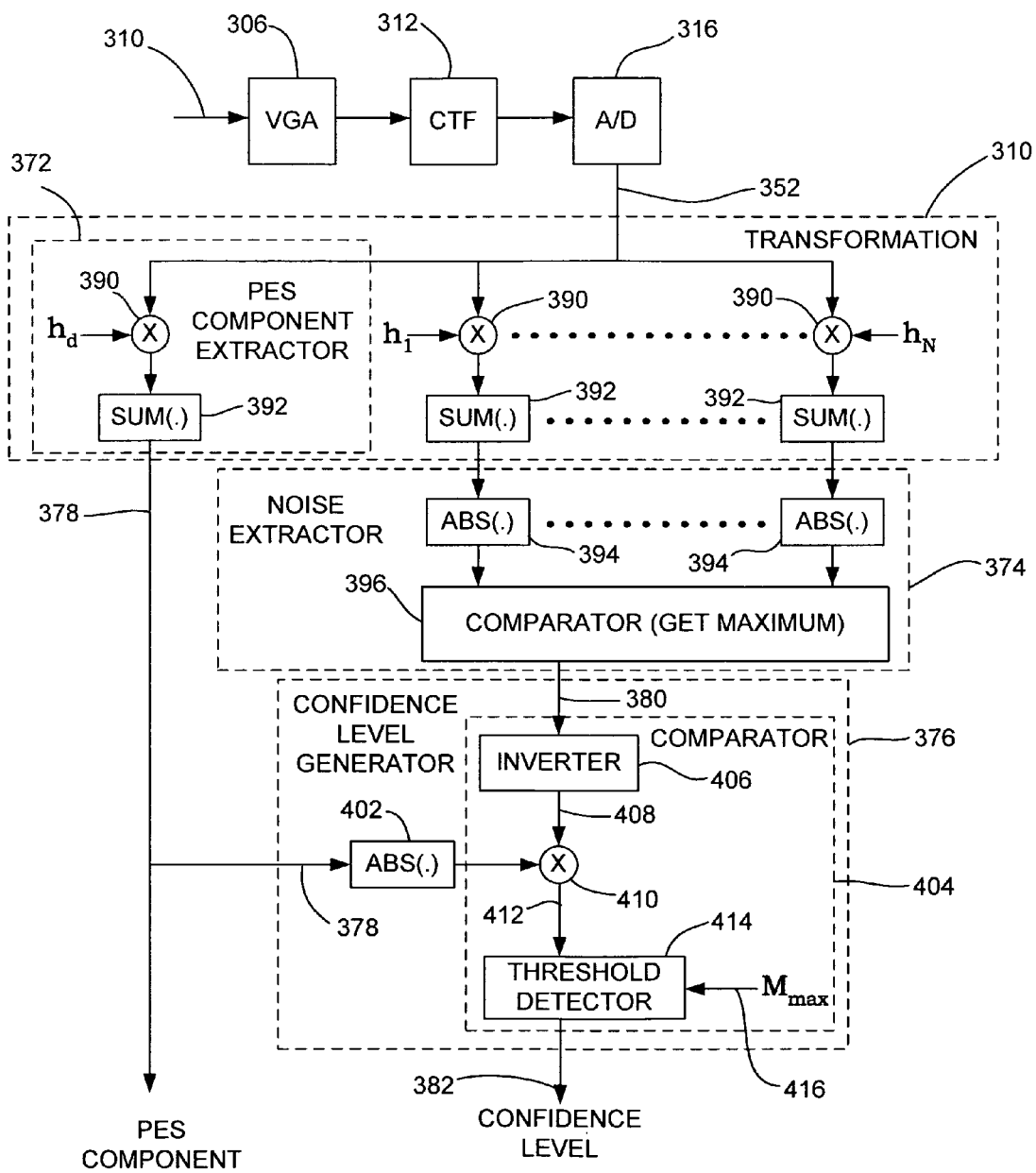

FIG. 8 is a block diagram of a portion of the servo control system in accordance with one embodiment of the invention that results in more manageable servo loop latency periods.

The transformation block 370 is configured to simultaneously multiply the correlated position signal samples 352 from the A/D converter 316 with all, or a select number of, the rows h of the transform matrix $\hat{H}$. Each of the rows h of the transform matrix $\hat{H}$ represent read back signal noise except row $h_d$, which corresponds to the PES component 378. In accordance with one embodiment of the invention, the transformation block 370 includes a plurality of multipliers 390 that are each fed a predetermined row $h_n$ (n represents the row) of the transform matrix $\hat{H}$ being used (e.g., Hadamard transform). The output from each multiplier 390 is summed with a summing block 392 to obtain the projection of the position signal samples 352 ($\bar{y}$(n)) onto the particular row $H_n$ of the transformed matrix $\hat{H}$ being used to thereby generate the PES component 378 and the noise components of the transformed vector $\bar{y}$.

One embodiment of the noise extractor 374 includes absolute value blocks 394, which obtain the absolute values of the noise component of the transformed vector $\bar{y}$ received from the transformation block 370. Additionally, the noise extractor 374 includes a comparator 396. The comparator 396 selects the maximum of the absolute values of the noise components provided by the absolute value blocks 394, which is then selected as the dominant noise level 380 (N). The noise level output 380 is then provided to the confidence level generator 376.

The multiplier 390 and the summing block 394 of the transformation block 370 corresponding to the PES component extractor 372 produce the position signal component of the transformed matrix $\bar{y}$, which corresponds to the PES component 378 of the read back signal. In accordance with one embodiment of the servo control system, the resultant PES component 378 is provided as an output signal. Additionally, the PES component is provided to the confidence level generator 376.

The confidence level generator 376 is configured to calculate an absolute value of the PES component 378 with absolute value block 402, which is then provided to a comparator 404. The dominant noise level 380 (N) is also provided to the comparator 404. The comparator generates the confidence level 382 (C) in response to a comparison between the PES component 378 and the noise level 380.

In accordance with one embodiment of the invention, the comparison between the PES component 378 and the noise level 380 involves calculating a confidence level ratio M of the absolute value of the PES component 378 to the noise level 380, as indicated in Equation 8.

$$M = \text{abs}[y(n_d)]/N \qquad \text{Eq. 8}$$

In accordance with one embodiment of the invention, the confidence level 382 (C) is set based on a comparison of the ratio M to a threshold value $M_{max}$, which can be set empirically. When M is less than $M_{max}$ the confidence level C is set to the ratio M and, otherwise, the confidence level C is set to 1 (or other constant value), as indicated in Equation 9. Accordingly, the confidence level will change as a function of the noise amount in the read back signal of the system. The larger the noise, the lower the confidence level will be.

$$C_{level} = \begin{Bmatrix} M & \text{if } M < M_{max} \\ 1 & \text{else} \end{Bmatrix} \qquad \text{Eq. 9}$$

Many alternative methods for calculating the confidence level C can be also used in accordance with the particular servo control system or the manner in which it is used.

Accordingly, one embodiment of the comparator 404 includes an inverter 406 that inverts the dominant noise level 380. The output from the inverter 406 is then multiplied by the PES component 378 using a multiplier 410 to calculate the ratio M, which is output as a signal 412. A threshold detector 414 then compares the ratio 412 to a predetermined value 416 ($M_{max}$) and outputs the confidence level 382 (C) according to Equation 9.

Although the servo loop latency of the servo system of FIG. 8 may be somewhat manageable, it will be complicated due to the large number of branches in the transformation block 370 that correspond to the components of the transformed domain representation (transformed vector $\bar{y}$). Thus, for a data sequence of length 64, we need 64 branches which means at least 64 times more complexity compared to the conventional single branch shown in FIG. 5.

The complexity of the architecture in FIG. 8 can be significantly reduced by configuring the transformation block 370 to generate only the components of the transformed vector $\bar{y}$ that are most likely to contain the dominant noise level 380 and the PES component 378. Some of the branches are easy to eliminate because they are basically unrelated to read back signal noise. For example, the branch $\bar{y}(1)$ corresponding to $h_1$ just takes the sum of the received position signal samples 352, which means the DC value of the signal. However, because of the CTF 312 in the system, the DC value of the signal is removed and, as a result, the branch $\bar{y}(1)$ corresponding to $h_1$ does not give any useful information. Similarly, the branch $\bar{y}(2)$ corresponding to $h_2$ equals alternating +1 s and −1 s, and again a properly designed CTF 312 will also filter out most of the energy at this frequency band. As a result, the complexity of the transformation block 370 and also the noise extractor 374 can be reduced by selecting a subset of the transformation matrix rows $h_n$ (e.g., Hadamard rows or chips) once the likely dominant noise sources have been identified for the system in which the servo control system is utilized, such as a disc drive.

Figure 9:
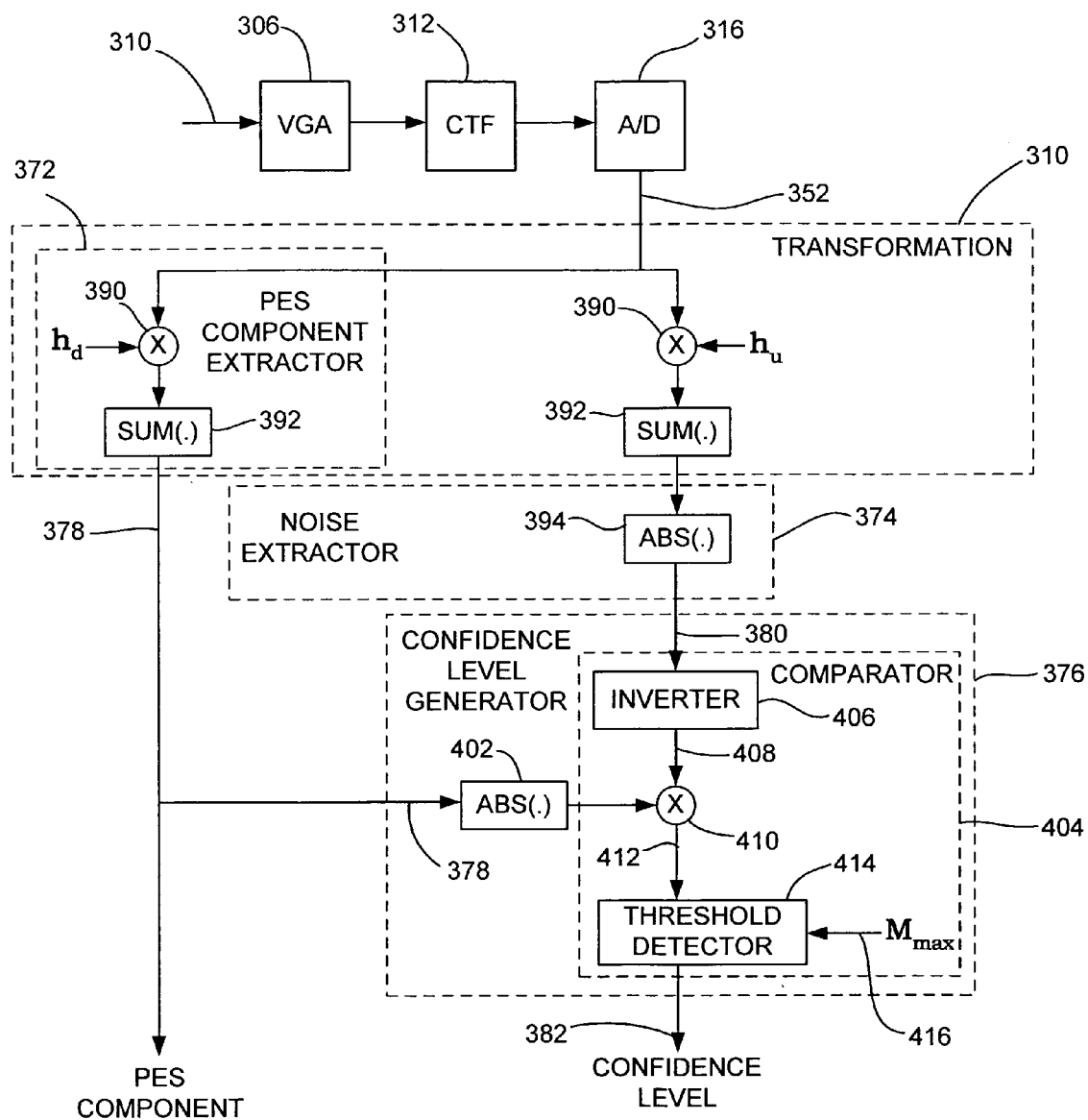

In accordance with one embodiment of the invention, only one row h(u) of the transformation matrix $\hat{H}$ corresponding to the likely dominant noise component N of the read back signal 310 is selected to generate the noise component $\bar{y}(u)$ of the transformed vector $\bar{y}$, which will be used as the noise level. The noise level ($\bar{y}(u)$) is provided to the absolute value block 394 of the noise extractor 374 to generate the final noise level 380, as shown in FIG. 9. The noise extractor 374, as shown in FIG. 9. The resultant noise level 380 is then compared to the PES component 378 as discussed above to generate the confidence level 382.

Confidence Level Generation Simulation

In order to provide a more thorough understanding of the invention, an example of the servo system in operation will be provided. The pattern utilized in this example will be the Null Pattern discussed above that consists of 32 pulses (or 16 servo periods) in each PS field (PS1 and PS2), and we have 2 samples for each pulse (or 4 samples for each period). Then, one servo period will be [1 1 −1 −1], and this repeats itself 16 times. We assume that this data is written in PS1, and half a track width shifted version is written in PS2.

Figure 10:
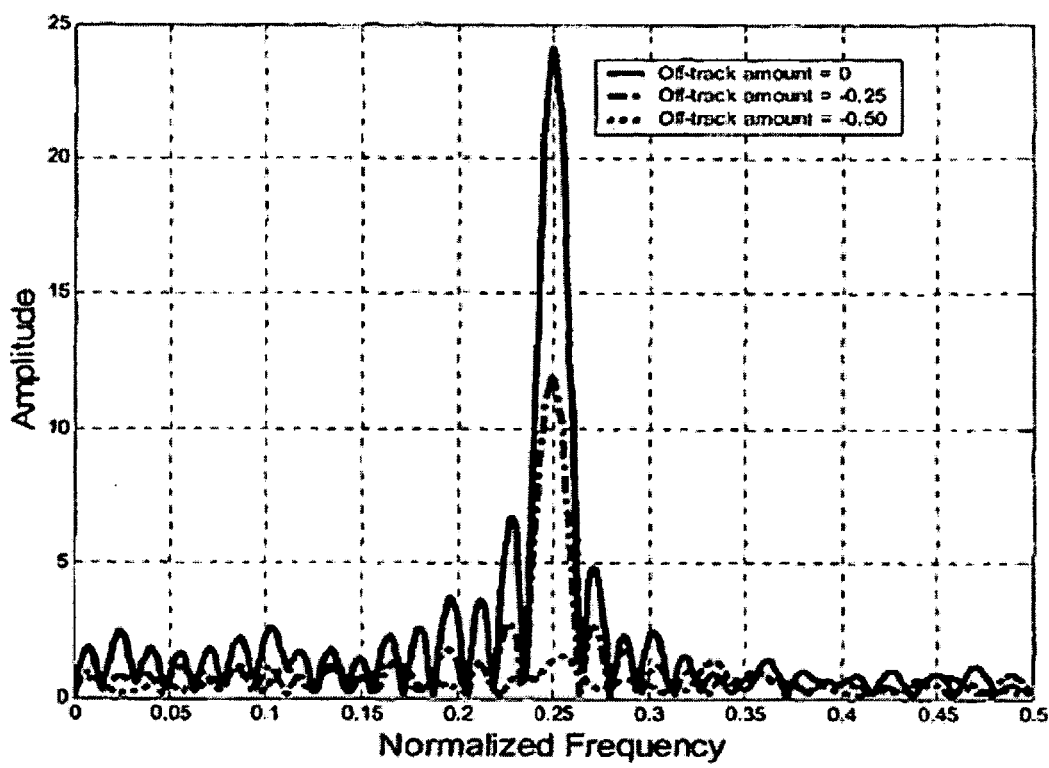
FIG. 10 is a plot of amplitude versus normalized frequency of sampled noisy read back signals corresponding to a servo burst pattern or field for different off-track values.

The output of the A/D converter 316 in (FIGS. 5 and 9) will initially be analyzed as a function of an off-track amount. For this purpose, we choose perpendicular magnetic recording architecture with normalized density (ND) equal to 1.5 in presence of only electronic noise of 20 dB. We set the gain of the VGA 306 to be constant, and configure the CTF 312 to be a simple low-pass filter (LPF). FIG. 10 shows the frequency domain representations of the sampled noisy read back signal corresponding to PS1 at the output of the A/D converter 316 as a function of the normalized frequency for different off-track values. As seen in FIG. 10, the signal has one dominant tone, and the amplitude of the signal changes as a function of off-track amount.

Figure 11:
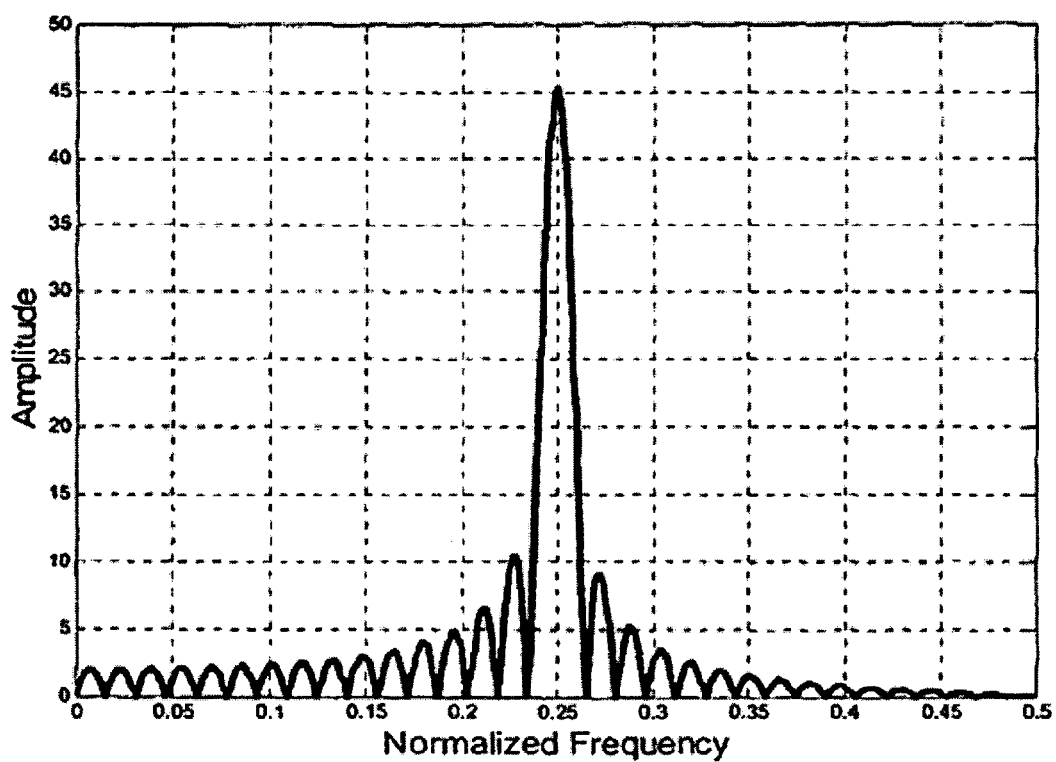
FIG. 11 is a plot of amplitude versus normalized frequency of the correlator signal of FIGS. 5 and 9.

A correlator 340 (shown only in FIG. 5) correlates the read back signal at the output of the A/D converter 316 with the dominant tone. The frequency domain representation of the correlator signal (d(k+φ) in FIG. 5 and hd in FIG. 9) is shown in FIG. 11. As can be seen, the correlator signal has a peak at the single tone of the read back signal. Thus, the sum of the correlator's output will be a very good estimator for the amplitude of the read back signal at the single tone, thus the amount of off-track in the system.

However, there is also noise in the system, and as the off-track value becomes closer to −0.5 of the track width for PS1 the signal amplitude reduces. This means that the Signal-to-Noise Ratio (SNR) of the system reduces. Thus, at off-track values where the signal amplitude is small, the noise in the system will mostly affect the off-track amount estimation. As a result, the PES component will likely be of low quality and highly inaccurate most of the time. The present invention generates additional information regarding the quality of the extracted PES component in the form of a confidence level for the PES component, using the method described above.

Figure 12:
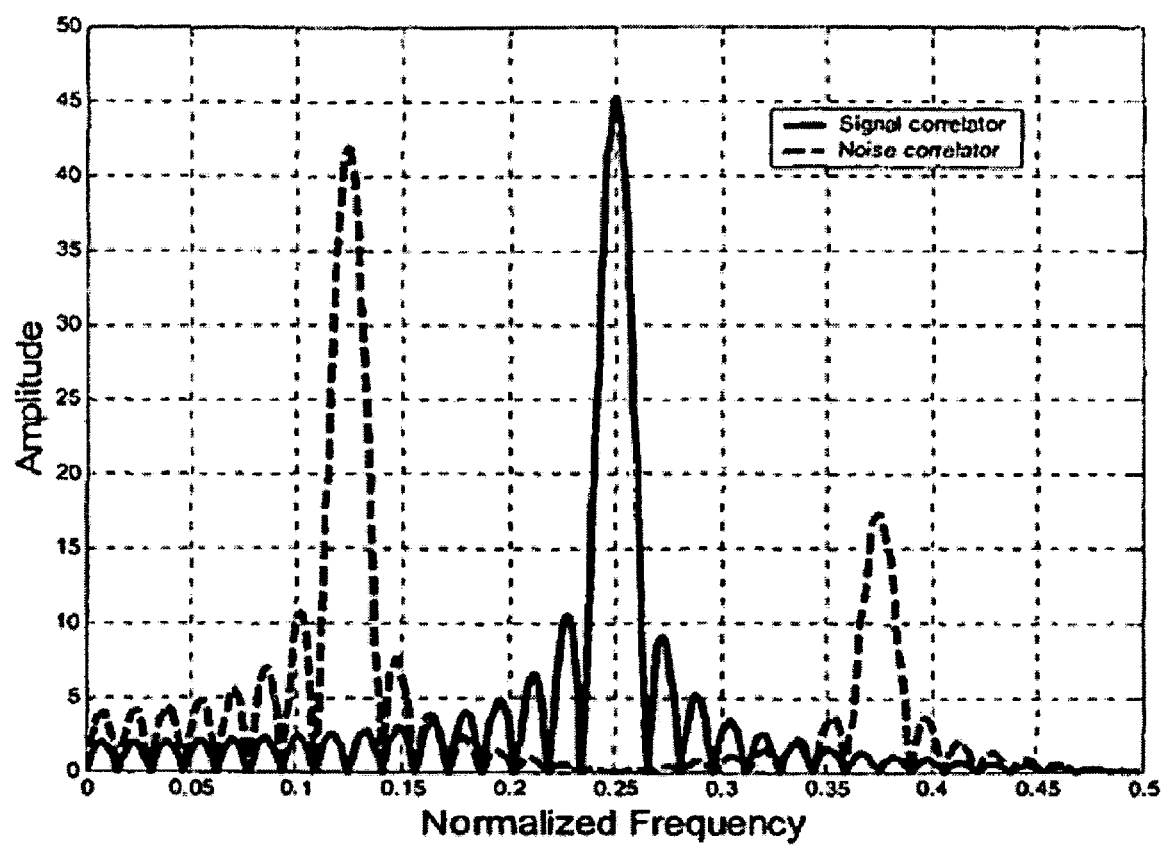
FIG. 12 is a plot of amplitude versus normalized frequency of a noise correlator $h_u$ together with a signal correlator $h_d$ of FIG. 9.
Figure 13A:
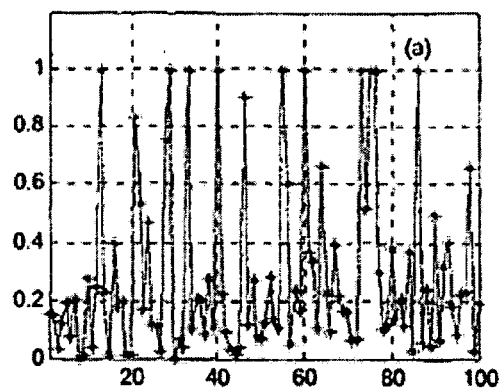
FIGS. 13A–13D are plots of confidence levels for 100 sectors corresponding to the PES component of the PS1 field when the servo system architecture of FIG. 9 is used.
Figure 13B:
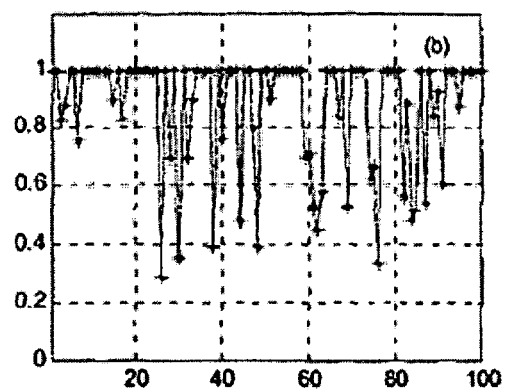
Figure 13C:
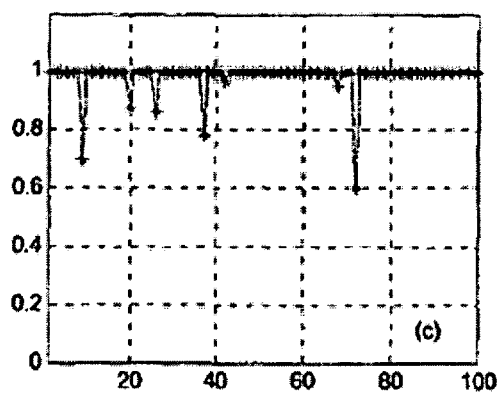
Figure 13D:
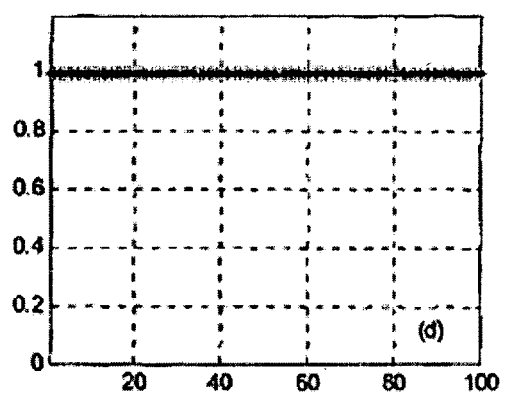
Figure 14A:
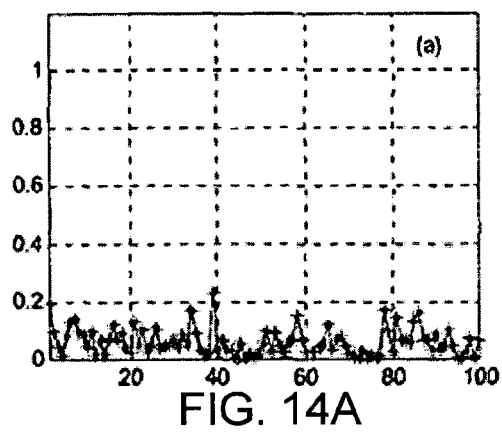
FIGS. 14A–14D are plots of the confidence levels for 100 sectors corresponding to the PES component of the PS1 field when the servo system architecture of FIG. 8 is used.
Figure 14B:
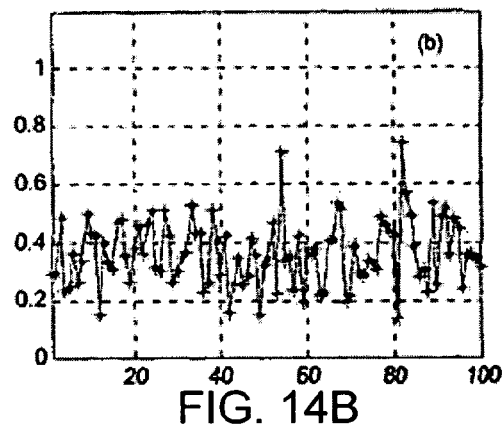
Figure 14C:
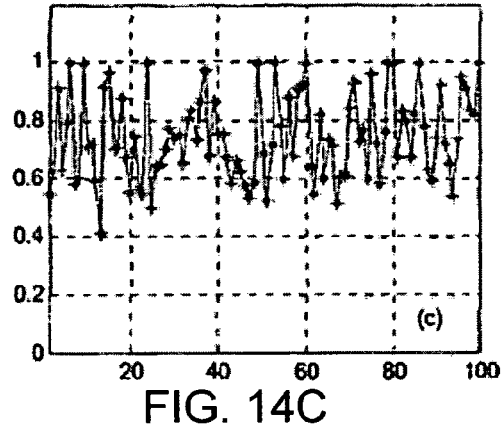
Figure 14D:
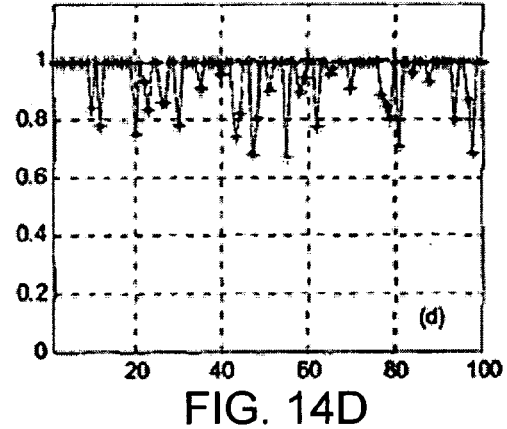

For this example we will utilize the architecture of the servo system shown in FIG. 9 and the correlator (not shown) of the upper branch $h_u$ is selected, which has a repetition of [1 1 1 1 −1 −1 −1 −1] which corresponds to the 5th row of the Hadamard matrix $\hat{H}_{64}$. The frequency domain representation of the noise correlator $h_u$ is shown in FIG. 12, together with that of position signal correlator $h_d$. As discussed above, the summation of the output of the noise correlator $h_u$ gives us information about the level of noise in the system. Then, we find the confidence level C from Equations 8 and 9. In Equation 9, $M_{max}$ means how much we want the PES component to be larger than the noise component for us to be confident about the PES component or the quality of the PES component.

With $M_{max}$ set to 5 (which corresponds to 10 $\log_{10}(5) \approx 7$ dB), 100 servo PS1 and PS2 bursts at 20 dB of electronic noise for different off-track values are run. FIGS. 13A–13D are plots of confidence levels (vertical axis) for 100 sectors (horizontal axis) corresponding to the PES component of the PS1 field when the servo system architecture of FIG. 9 is used and the off-track amounts are −0.50, −0.45, −0.40, and −0.35, respectively. Similarly, FIGS. 14A–14D are plots of the confidence levels (vertical axis) for 100 sectors (horizontal axis) corresponding to the PES component of the PS1 field when the more complex servo system of FIG. 8 is used and the off-track amounts are −0.50, −0.45, −0.40, and −0.35, respectively. The mean values of the 100 confidence levels in FIGS. 13A–13D are 0.29, 0.88, 0.99, and 1, respectively. Similarly, the mean values of the 100 confidence levels in FIGS. 14A–14D are 0.06, 0.36, 0.74, and 0.95, respectively.

Although the confidence level numbers generated by the simplified servo system architecture of FIG. 9 differ from those produced by the more complicated architecture of FIG. 8, the trend is the same. That is, whenever the PES component becomes large relative to the noise level, the confidence level number increases. The confidence levels generated by the two systems could be made to look similar by choosing different $M_{max}$ numbers for the two different architectures. Thus, using the simplified servo system architecture of FIG. 9 may be sufficient for many systems.

Similar results have been observed for longitudinal recording channels, as opposed to the perpendicular recording channels utilized in the above example.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the method or system of the present invention while maintaining substantially the same functionality without departing from the scope and spirit of the present invention.

In particular, the description of the present invention utilized the Null Pattern, as an exemplary servo pattern. The selection of that servo pattern resulted in the use of the Hadamard transform as the exemplary transform used to generate the transformed domain representation (transformed vector $\bar{y}$) of the position signal samples of the read back signal. However, it should be understood that confidence levels can be generated for any servo pattern using its associated transform, as we can always find the null space of the signal component corresponding to any given servo pattern. This null space helps us estimate the amount of noise in the system, from which a noise level can be generated and compared to the PES component to obtain the confidence level. Additionally, if tuned accordingly, the proposed servo system architectures, such as that provided in FIG. 8 or 9, can also be used to detect dominant noise and/or distortion effects in the servo system. Thus, other than their usage explained in this document, the proposed servo system architectures can also be used for the detection of impurities for either system characterization and/or to trigger a possible cancellation algorithm for that specific impurity in the system.

Furthermore, the method described herein regarding the generation of the confidence levels is only one of many possible methods that may be used. For instance, different components of the servo control system may be utilized to generate the confidence levels and they may be processed in other blocks of the servo control system.

Finally, although the preferred embodiment described herein is directed to a servo control system for disc drive, it will be appreciated by those skilled in the art that the teachings of the present invention can be applied to other control systems, without departing from the scope and spirit of the present invention.

What is claimed is:

1. A method of generating a confidence level of a position error signal (PES) component produced by a servo control system, the method comprising:
   a) generating a PES component using position signal samples of a read back signal corresponding to a servo burst pattern;
   b) extracting a noise level corresponding to noise in the read back signal using the position signal samples; and
   c) generating a confidence level based on the PES component and the noise level, wherein the confidence level is indicative of a quality of the PES component.

2. The method of claim 1, wherein the extracting step b) includes:
   generating a transform domain representation of the position signal samples based on the sampling frequency and the burst pattern; and
   extracting the noise level from the transform domain representation.

3. The method of claim 2, wherein the generating a transform domain representation of the position signal samples includes multiplying the position signal samples with a transformation matrix to form the transformed domain representation in the form of a vector that includes noise components relating to noise in the read back signal and a position signal component corresponding to the PES component.

4. The method of claim 3, wherein the extracting step b) includes:
   identifying the noise component having a maximum absolute value; and
   setting the noise level to the noise component having the maximum absolute value.

5. The method of claim 3, wherein the extracting step b) includes setting the noise level to an absolute value of the noise component of the transformed domain representation that is likely to correspond to a dominant noise component of the read back signal.

6. The method of claim 1, wherein:
   the generating step c) includes calculating a ratio of the PES component to the noise level; and
   the method includes comparing the ratio to a threshold value.

7. The method of claim 6 including setting the confidence level to the ratio when the ratio is less than the threshold value.

8. The method of claim 6 including setting the confidence level to a predefined constant value when the ratio is greater than the threshold value.

9. A method of generating confidence level of a position error signal (PES) component produced by a servo control system that is indicative of a quality of the PES component, the method comprising:
   a) obtaining position signal samples of a read back signal corresponding to a servo burst pattern taken at a sampling frequency;
   b) generating a transform domain representation of the position signal samples based on the sampling frequency and the burst pattern;
   c) generating a PES component based on a position signal component of the transformed domain representation;
   d) extracting a noise level from the transformed domain representation corresponding to noise in the read back signal; and
   e) generating a confidence level based on the PES component and the noise level.

10. The method of claim 9, wherein the generating step b) includes multiplying the position signal samples with a transformation matrix to form the transformed domain representation in the form of a vector that includes noise components relating to noise in the read back signal and a position signal component corresponding to the PES components.

11. The method of claim 10, wherein the extracting step d) includes:
   identifying the noise component having a maximum absolute value; and
   setting the noise level to the noise component having the maximum absolute value.

12. The method of claim 10, wherein the extracting step d) includes setting the noise level to an absolute value of the noise component of the transformed domain representation that is likely to correspond to a dominant noise component of the read back signal.

13. The method of claim 9, wherein the generating step e) includes comparing the PES component and the noise level.

14. The method of claim 13, wherein:
the comparing of the PES component and the noise level includes calculating a ratio of the PES component to the noise level; and
the method includes comparing the ratio to a threshold value.

15. The method of claim 14 including:
setting the confidence level to the ratio when the ratio is less than the threshold value; and
setting the confidence level to a predefined constant when the ratio is greater than the threshold value.

16. A servo control system configured to control a position of a transducing head in response to position signal samples of a read back signal corresponding to a servo burst pattern taken at a sampling frequency, the system comprising:
a transformation block having a transformed domain representation output of the position signal samples;
a position error signal (PES) component extractor having a PES component output corresponding to the servo burst pattern, which is based on the position signal samples;
a noise extractor having a noise level output corresponding to noise in the read back signal, which is based on the transformed domain representation; and
a confidence level generator having a confidence level output that is indicative of a quality of the PES component based on the PES component output and the noise level output.

17. The system of claim 16, wherein the transformation block includes a plurality of multipliers, each having an output based on a multiplication of the position signal samples with a row of a transformation matrix, and summing blocks each having an output of a vector component of the transformed domain representation.

18. The system of claim 17, wherein:
the vector components of the transformed domain representation include noise components relating to noise in the read back signal and a position signal component corresponding to the PES component; and
the noise extractor includes a comparator having the noise level output corresponding to a maximum of a plurality of noise component inputs.

19. The system of claim 18, wherein the confidence level generator includes:
an inverter including an inverted noise level output corresponding to an inversion of the noise level output; and
a multiplier having a confidence level ratio output corresponding to a multiplication of the inverted noise level output with the PES component output;
wherein the confidence level generator is configured to produce the confidence level based on the confidence level ratio output.

20. The system of claim 19 including a comparator including the confidence level output and inputs of the confidence level ratio output and a threshold value, wherein the confidence level output is set to a predetermined constant when the confidence level ratio output exceeds the threshold value, and the confidence level output is set to the confidence level ratio output when the confidence level ratio output is less than the threshold value.

* * * * *